United States Patent
Chen et al.

(10) Patent No.: US 9,134,769 B2
(45) Date of Patent: Sep. 15, 2015

(54) PORTABLE ELECTRONIC DEVICE AND AN INPUT MODULE AND A FLEXIBLE BRIDGING BOARD THEREOF

(75) Inventors: Wei-Ming Chen, New Taipei (TW); Wei-Wen Yang, New Taipei (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 360 days.

(21) Appl. No.: 13/606,171

(22) Filed: Sep. 7, 2012

(65) Prior Publication Data
US 2013/0314323 A1    Nov. 28, 2013

(30) Foreign Application Priority Data

May 22, 2012 (TW) ............................. 101118135 A

(51) Int. Cl.
*G06F 3/02* (2006.01)
*G06F 1/16* (2006.01)
(52) U.S. Cl.
CPC ...................................... *G06F 1/169* (2013.01)
(58) Field of Classification Search
None
See application file for complete search history.

(56) References Cited

U.S. PATENT DOCUMENTS

| | | | |
|---|---|---|---|
| 6,448,957 B1 * | 9/2002 | Chia-Hung | 345/161 |
| RE40,323 E * | 5/2008 | Bae | 345/157 |
| 7,663,604 B2 | 2/2010 | Maruyama et al. | |
| 2004/0100449 A1 * | 5/2004 | Chuang et al. | 345/173 |
| 2005/0030728 A1 | 2/2005 | Kawashima et al. | |
| 2007/0144885 A1 * | 6/2007 | Nakatani et al. | 200/520 |
| 2010/0103611 A1 | 4/2010 | Yang et al. | |
| 2014/0016291 A1 * | 1/2014 | Horii et al. | 361/807 |

FOREIGN PATENT DOCUMENTS

| | | |
|---|---|---|
| CN | 201440224 U | 4/2010 |
| TW | 201017379 A | 5/2010 |
| TW | 201214218 A1 | 4/2012 |

* cited by examiner

*Primary Examiner* — William Boddie
*Assistant Examiner* — Alecia D English
(74) *Attorney, Agent, or Firm* — Muncy, Geissler, Olds & Lowe, P.C.

(57) ABSTRACT

An input module is mounted on a portable electronic device and has a sensing substrate and a cover lens mounted on a top surface of the sensing substrate, a physical switch mounted on and electrically connected to a bottom surface of the sensing substrate, and a flexible bridging board having two opposite short sides respectively protruding from two short sides of the sensing substrate for the two short sides of the flexible bridging board to be mounted on the electronic device. As the two short sides of the input module are mounted on the electronic device and a lever arm between a pressed point to a fixed point of the input module is shortened, a torque applied to the input module is lowered and the input module is not easily deformed.

53 Claims, 13 Drawing Sheets

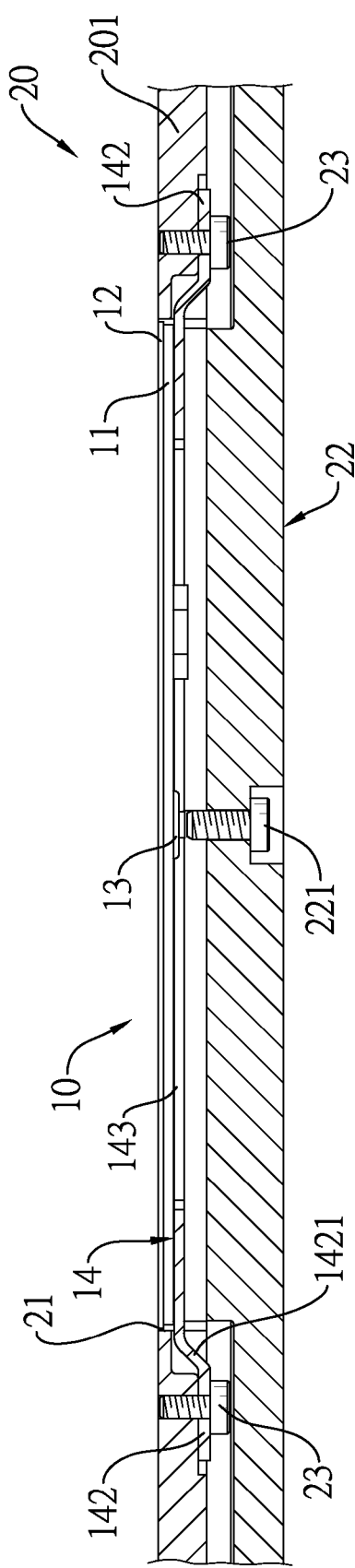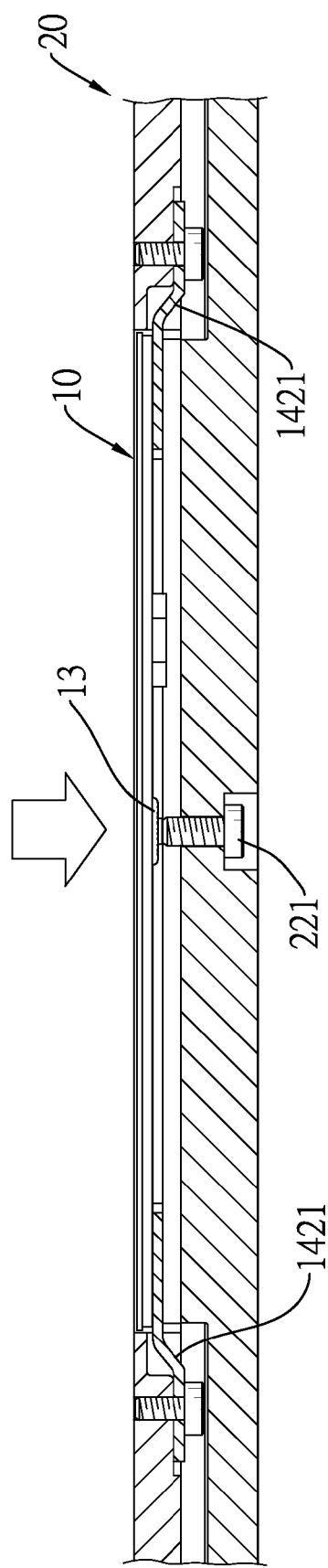

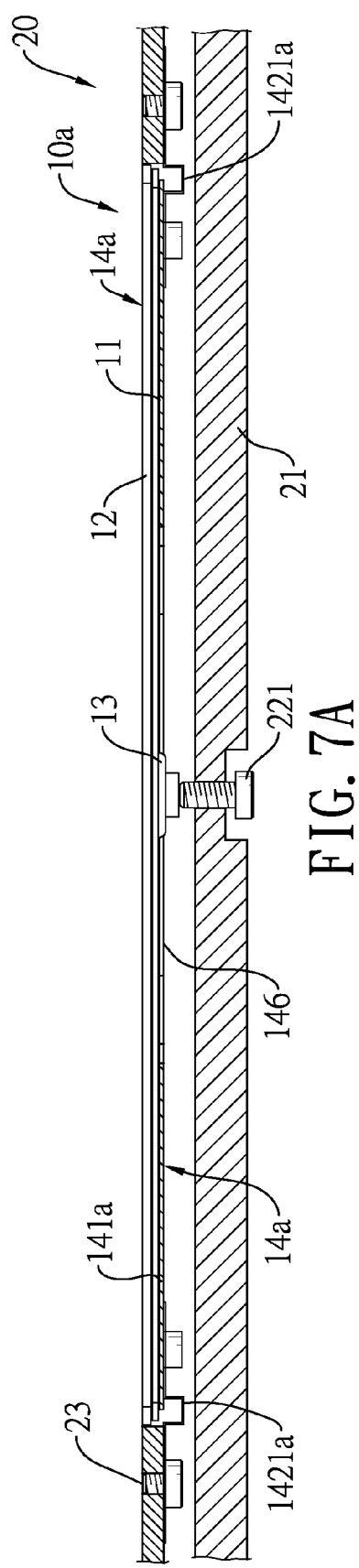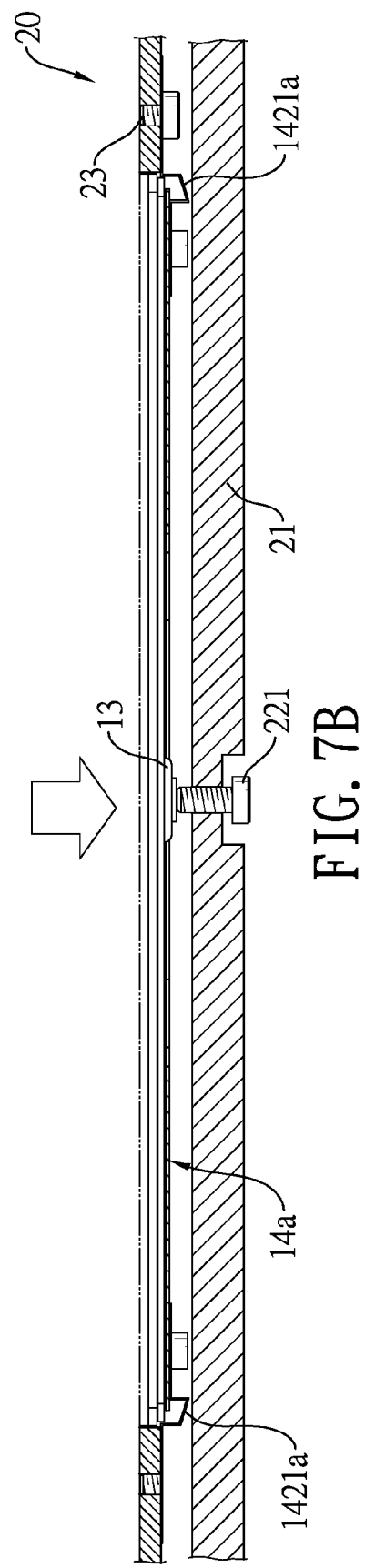

PORTABLE ELECTRONIC DEVICE AND AN INPUT MODULE AND A FLEXIBLE BRIDGING BOARD THEREOF

The current application claims a foreign priority to the patent application of Taiwan No. 101118135 filed on May 22, 2012.

BACKGROUND OF THE INVENTION

1. Field of the Invention

The present invention relates to an input module of a portable electronic device and more particularly to an input module of a portable electronic device being durable and resistant to bending deformation.

2. Description of the Related Art

Technological progress has created many portable electronic devices to facilitate electronic operations of users. When it comes to the cursor control of notebook computers or tablet personal computers (PC), mice of desktop computers are technically feasible while they are inconvenient as far as portability is concerned. Such inconvenience opens a door for input modules mounted on portable electronic devices. With reference to FIG. 8A, users can control cursor positions by moving their fingers on the input module 60. To completely replace the function of a mouse, the input module 60 further has a physical switch serving for users to press and simulating the functions of the left button and the right button of a regular mouse.

With reference to FIGS. 9 and 10, a conventional input module 60 of a portable electronic device has a sensing board 61, a cover lens 62, a physical switch 63 and a side-fixing plate 64.

The cover lens 62 is mounted on a top surface of the sensing board 61 for users' fingers to touch.

The physical switch 63 is mounted on and electrically connected to a bottom surface of the sensing board 61, and is adjacent to a central position of one of two relatively long sides of the sensing board 61.

The side-fixing plate 64 is shorter than the sensing board 61 in width and is mounted on the other relatively long side of the sensing board 61. One side of the side-fixing plate 64 protrudes beyond one of the two relatively long sides of the sensing board 61. The side-fixing plate 64 is screwed on an assembly portion 51 on the front of the portable electronic device.

With reference to FIG. 11, to let the physical switch 63 of the input module 60 be activated when the cover lens 62 is pressed down, the assembly portion 51 has a protrusion 52 to correspond to the physical switch 63. When the cover lens 62 is pressed, the physical switch 63 abuts against the protrusion 52 and is activated. Meanwhile, the input module 60 detects a force application point exerted by a user on a left half region or a right half region of the cover lens 62 with respect to the physical switch 63 to correspond to input signals of a left button and a right button and implement the control functions of the left button and right button of a mouse.

As mentioned, the foregoing input module 60 can identify users' left-button or right-button operations with single physical switch 63. With reference to FIG. 8B, one of two relatively long sides of the input module 60 is fastened on the assembly portion 51 through the side-fixing plate 64, and users oftentimes press corners indicated by a letter 'F' and being adjacent to the other relatively long side and two relatively short sides of the input module 60 to input through the left button or the right button. According to the torque equation, a lever arm D1 is determined by a distance between the pressed point 'F' and a fixed point (fulcrum), and a torque is obtained by a product of the lever arm and a force. The longer the lever arm is, the higher the torque and the bending stress are. After having been operated for a long time, the input module is prone to permanent deformation and gaps formed between the assembly portion 51 and the portable electronic device easily store dirt and filth that is hard to be cleaned up.

SUMMARY OF THE INVENTION

A first objective of the present invention is to provide an input module being durable and resistant to bending deformation.

To achieve the foregoing objective, the input module has a sensing substrate, a cover lens, a physical switch and a flexible bridging board.

The sensing substrate has a top surface, a bottom surface, two relatively long sides and two relatively short sides. The bottom surface is opposite to the top surface.

The cover lens is mounted on the top surface of the sensing substrate.

The physical switch is mounted on and is electrically connected to the bottom surface of the sensing substrate.

The flexible bridging board is mounted on the bottom surface of the sensing substrate and has two relatively short sides and two relatively long sides.

The relatively short sides respectively protrude from the two relatively short sides of the sensing substrate.

Each relatively long side is kept at a distance from one of the relatively long sides of the sensing substrate.

The input module of the present invention is mounted on the assembly portion by fixing two relatively short sides of the flexible bridging board on the assembly portion. When a pressed point falls on any of four corners of the input module, a distance between the pressed point to a fixed point to the relatively short side is effectively shortened in comparison with the distance on the conventional input module with a single relatively long side fastened. Accordingly, a bending stress applied to the input module is reduced, the time before the input module generates permanent deformation is postponed and the operation duration of the input module is prolonged.

A second objective of the present invention is to provide a portable electronic device having an input module being durable and resistant to bending deformation.

To achieve the foregoing objective, the portable electronic device has a body and an input module.

The body has an opening and an assembly portion. The opening is formed through one side of the body. The assembly portion correspondingly mounted to the opening.

The input module is mounted on the assembly portion through the opening of the body, and has a sensing substrate, a cover lens, a physical switch and a flexible bridging board.

The sensing substrate has a top surface, a bottom surface, two relatively long sides and two relatively short sides. The bottom surface is opposite to the top surface.

The cover lens is mounted on the top surface of the sensing substrate and is exposed from the opening of the body.

The physical switch is mounted on and electrically connected to the bottom surface of the sensing substrate.

The flexible bridging board is mounted on the bottom surface of the sensing substrate and has two relatively short sides and two relatively long sides.

The relatively short sides respectively protrude from the two relatively short sides of the sensing substrate and are mounted on the assembly portion of the body.

Each relatively long side is kept at a distance from one of the relatively long sides of the sensing substrate.

The input module of the portable electronic device is mounted on the assembly portion by fixing two relatively short sides of the flexible bridging board on the assembly portion and the physical switch is centrally mounted on the bottom surface of the sensing substrate. When a pressed point falls on any of four corners of the input module, a distance between the pressed point to a fixed point to the relatively short side is effectively shortened in comparison with the distance on the conventional input module with a single relatively long side fastened. Accordingly, a bending stress applied to the input module is reduced, the time before the input module generates permanent deformation is postponed and the operation duration of the input module is prolonged.

Other objectives, advantages and novel features of the invention will become more apparent from the following detailed description when taken in conjunction with the accompanying drawings.

BRIEF DESCRIPTION OF THE DRAWINGS

FIG. 4A is a partially cross-sectional view of an input module of the portable electronic device in FIG. 3A;

FIG. 4B is an operational cross-sectional view of the input module in FIG. 4A;

FIG. 7A is a cross-sectional side view of the input module in FIG. 5;

FIG. 7B is an operational cross-sectional side view of the input module in FIG. 5;

DETAILED DESCRIPTION OF THE INVENTION

Figure 1:
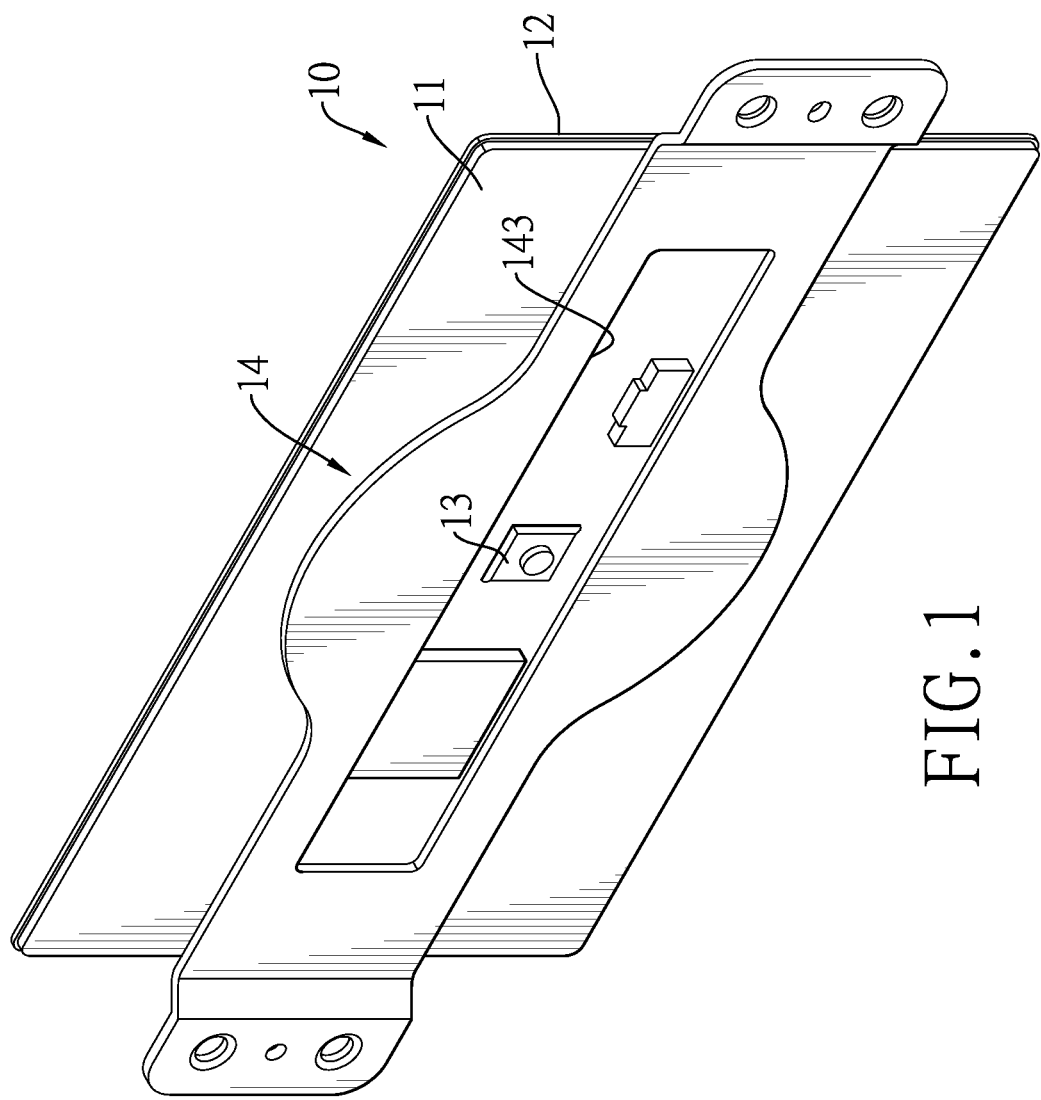
FIG. 1 is a perspective view of a first embodiment of an input module in accordance with the present invention.
Figure 2:
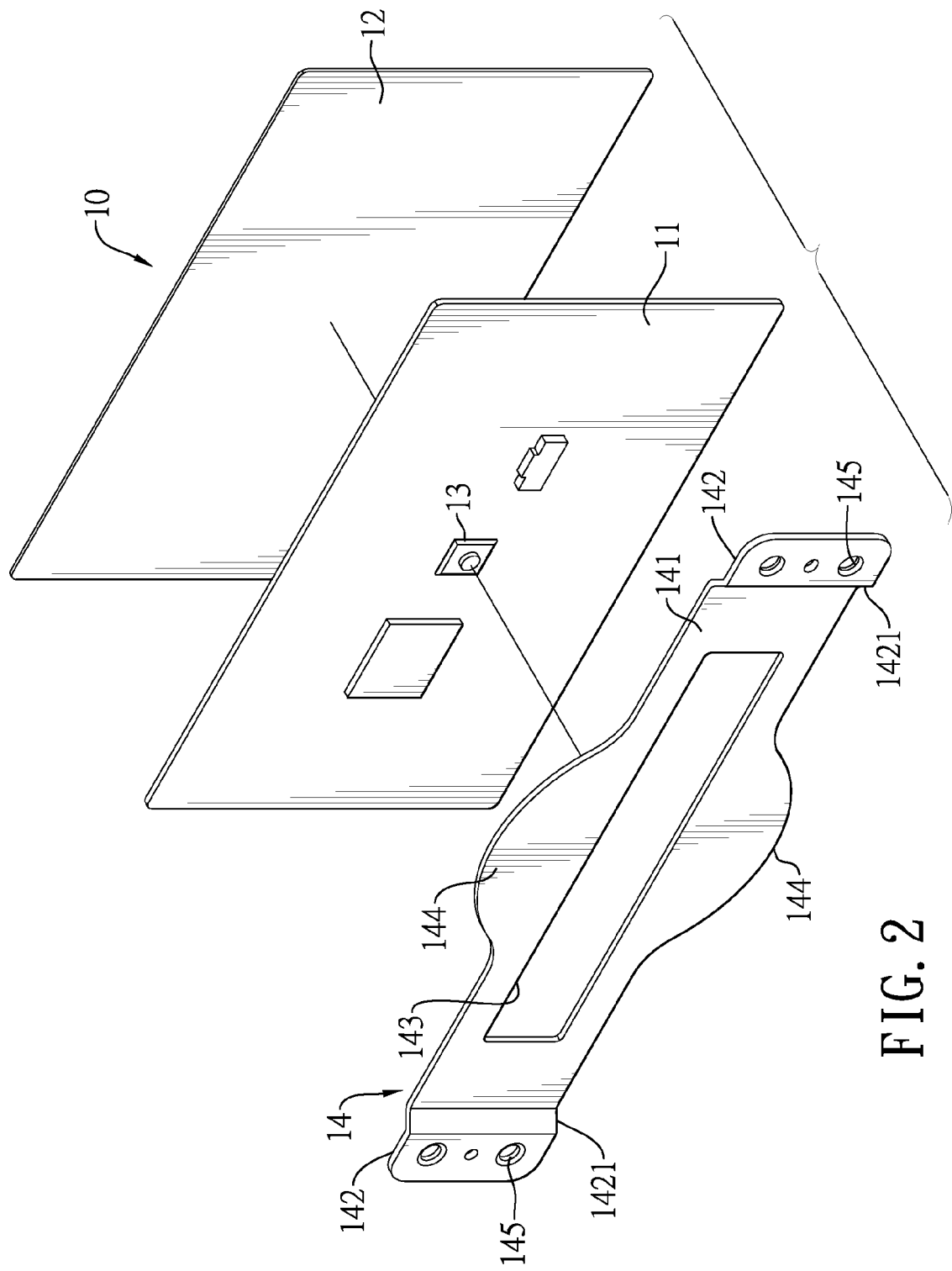
FIG. 2 is an exploded perspective view of the input module in FIG. 1.

With reference to FIGS. 1 and 2, a first embodiment of an input module 10 in accordance with the present invention has a sensing substrate 11, a cover lens 12, a physical switch 13 and a flexible bridging board 14.

The sensing substrate 11 has a top surface and a bottom surface opposite to the top surface. The top surface has a sensing circuit formed thereon. The sensing substrate 11 further has two relatively long sides and two relatively short sides, and may be a printed circuit board (PCB) or a membrane.

The cover lens 12 is mounted on the top surface of the sensing substrate 11 for fingers to touch, and may be composed of Mylar or glass.

The physical switch 13 is mounted on and electrically connected to the bottom surface of the sensing substrate 11. In the present embodiment, single physical switch 13 is employed. The physical switch 13 is centrally mounted on the bottom surface of the sensing substrate 11 and may be a bounce switch.

The flexible bridging board 14 is mounted on the bottom surface of the sensing substrate 11 and has two relatively short sides respectively protruding from the two relatively short sides of the sensing substrate 11. In the present embodiment, the flexible bridging board 14 is narrower than the sensing substrate 11 in width, and the relatively long sides of the flexible bridging board 14 can be kept at an equal distance from the corresponding relatively long sides of the sensing substrate 11. Besides, as the flexible bridging board 14 is longer than the sensing substrate 11 in length, the two relatively two short sides of the flexible bridging board 14 respectively protrude beyond the relatively short sides of the sensing substrate 11. In the present embodiment, the flexible bridging board 14 has a bridging body 141 and two fixing portions 142.

The bridging body 141 is flatly mounted on the bottom surface of the sensing substrate 11 and has a rectangular opening 143 and two support wings 144. The rectangular opening 143 is formed through the bridging body 141 to correspond to the physical switch 13 and prevents from interfering with the operation of the physical switch 13. The two support wings 144 are arced and are formed on and protrude from the two relatively long sides of the bridge body 141 so as to provide more support area.

The two fixing portions 142 are respectively located at two relatively short sides of the bridging body 141 and each fixing portion 142 has at least one fixing hole 145 formed therethrough. Each one of the at least one fixing hole 145 is mounted through by a fastening element, such as a bolt 23 or other fastening means, for the corresponding fixing portion 142 to be securely mounted on a corresponding position of an assembly portion 22. With reference to FIG. 4A, the flexible bridging board 14 further has two bending portions 1421 respectively formed between the bridging body 141 and the fixing portions 142. Hence, the flexible bridging board 14 protects against bending deformation through the two bending portions 1421. In the present embodiment, the flexible bridging board 14 is made of plastic material, and the bridging body 141 and the two fixing portions 142 are integrally formed.

With reference to FIGS. 3A-4B, a first embodiment of a portable electronic device 20 in accordance with the present invention has a body 201 and an input module 10.

The body 201 has an opening 21 and an assembly portion 22. The opening is formed through one side of the body 201. The assembly portion 22 is correspondingly mounted to the opening 21. In the present embodiment, the assembly portion 22 has a raised block 221. The raised block 221 may be a bolt.

The input module 10 is mounted on the assembly portion 22 through the opening 21 of the body 201, and has a sensing substrate 11, a cover lens 12, a physical switch 13 and a flexible bridging board 14.

The sensing substrate 11 has a top surface and a bottom surface opposite to the top surface. The top surface has a sensing circuit formed thereon. The sensing substrate 11 further has two relatively long sides and two relatively short sides, and may be a printed circuit board (PCB) or a membrane.

The cover lens 12 is mounted on the top surface of the sensing substrate 11 and is exposed from the opening 21 of the body 201 for fingers to touch, and may be composed of Mylar or glass.

The physical switch 13 is mounted on and electrically connected to the bottom surface of the sensing substrate 11, and aligns with the raised block 221 of the assembly portion 22. In the present embodiment, single physical switch 13 is employed. The physical switch 13 is centrally mounted on the bottom surface of the sensing substrate 11 and may be a bounce switch.

The flexible bridging board 14 is mounted across the two relatively short sides of the sensing substrate 11 and mounted on the bottom surface of the sensing substrate 11 and has two relatively short sides respectively protruding from the two relatively short sides of the sensing substrate 11. The flexible bridging board 14 is narrower than the sensing substrate 11 in width so the relatively long sides of the flexible bridging board 14 can be kept at an equal distance from the corresponding relatively long sides of the sensing substrate 11. Besides, as the flexible bridging board 14 is longer than the sensing substrate 11 in length, the two relatively two short sides of the flexible bridging board 14 respectively protrude beyond the relatively short sides of the sensing substrate 11 and are mounted on the assembly portion 22 of the body 201. The flexible bridging board 14 has a bridging body 141 and two fixing portions 142.

The bridging body 141 corresponds to the bottom surface of the sensing substrate 11, and has a rectangular opening 143 and two support wings 144. The rectangular opening 143 is formed through the bridging body 141 to correspond to the physical switch 13 and prevents from interfering with the operation of the physical switch 13. Each support wing 144 is arced and is formed on and protrudes from one of the relatively long sides toward a corresponding relatively long side of the sensing substrate 11 so as to provide more support area.

The two fixing portions 142 respectively protrude beyond the two relatively short sides of the flexible bridging board 14, and each fixing portion 142 has at least one fixing hole 145 formed therethrough. Each one of the at least one fixing hole 145 is mounted through by a fastening element, such as a bolt 23 or other fastening means, for the corresponding fixing portion 142 to be securely mounted on a corresponding position of an assembly portion 22. The flexible bridging board 14 further has two bending portions 1421 respectively formed between the bridging body 141 and the fixing portions 142 against bending deformation. In the present embodiment, the flexible bridging board 14 is made of plastic material, and the bridging body 141 and the two fixing portions 142 are integrally formed.

Figure 3A:
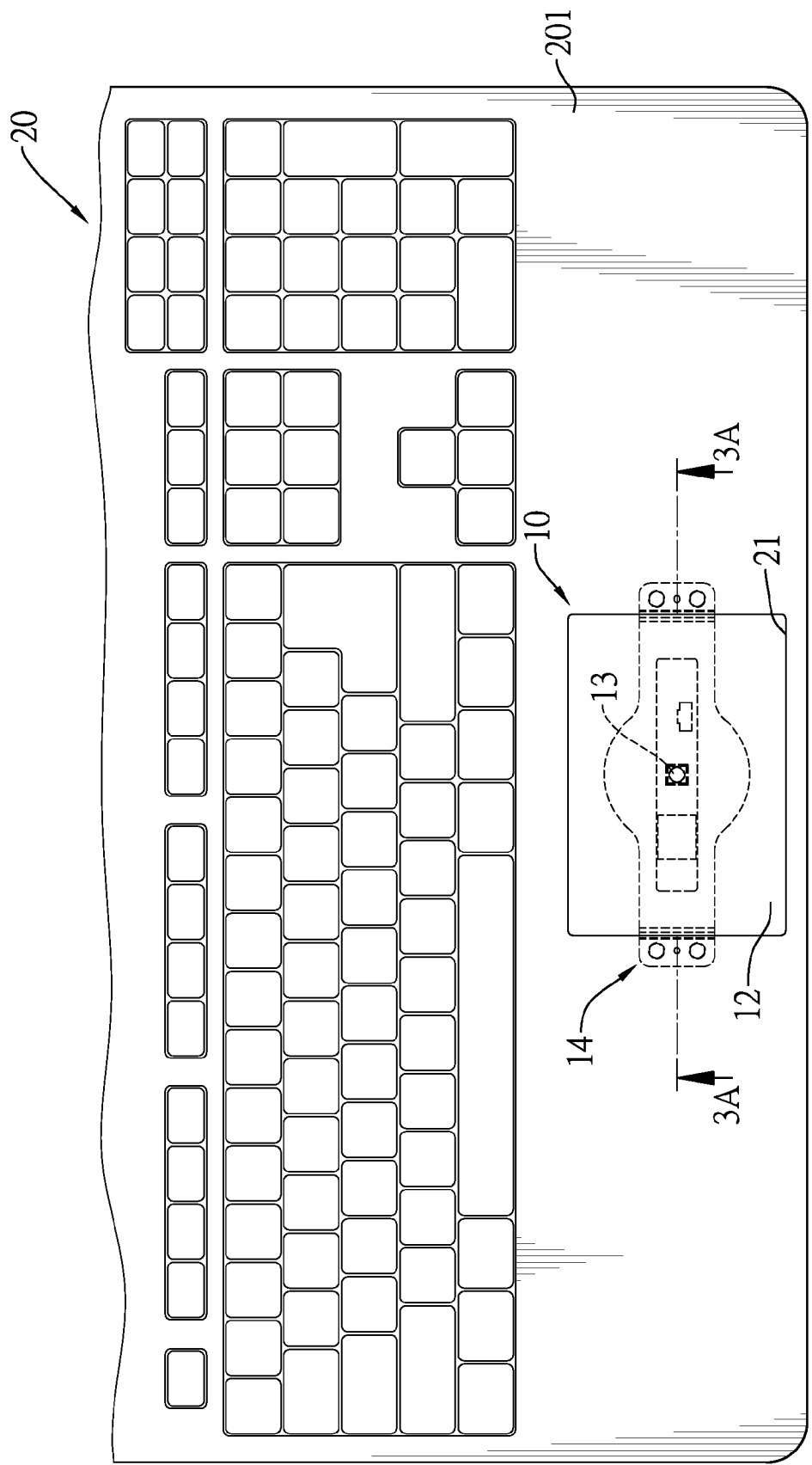
FIG. 3A is a partial top view of a first embodiment of a portable electronic device in accordance with the present invention.
Figure 3B:
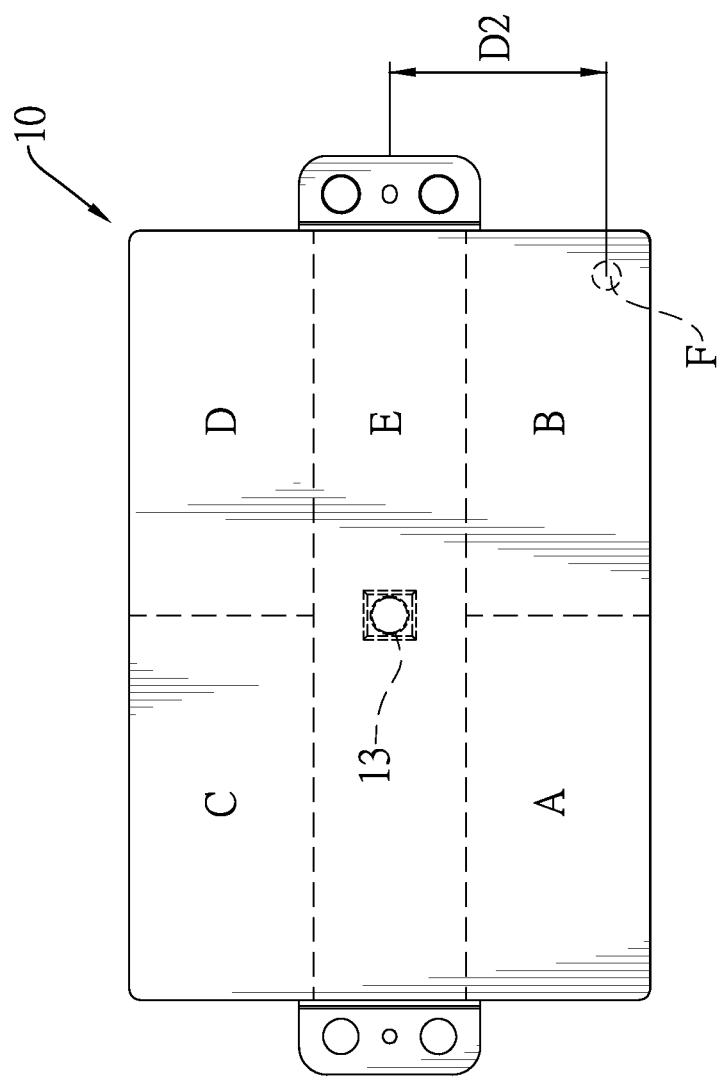
FIG. 3B is a schematic top view of the input module in FIG. 1 having multiple function button areas.

With reference to FIGS. 4A and 4B, when users press the input module 10, the physical switch 13 at the central position is pressed down to abut against the raised block 221 of the assembly portion 22 and is activated, and an coordinate of the pressed position on the cover lens 12 is detected, the input module 10 outputs a corresponding control signal. The single physical switch 13 of the input module 10 is centrally located on the bottom surface of the sensing substrate 11. The two relatively short sides of the input module 10 are fastened on the assembly portion 22 while the two relatively long sides of the input module 10 are not. Hence, users can press any position on the cover lens 12 to activate the central physical switch 13. The input module 10 may have at least three functional button areas. With reference to FIG. 3B, the input module 10 has five functional button areas represented by A~E. The two adjacent functional button areas A, B near one of the two relatively long sides of the input module serve as a left button and a right button. The two adjacent functional button areas C, D near the other relatively long side and the central functional button area E are available for manufacturers of portable electronic devices to flexibly design other functions, such as volume or luminance control.

Figure 5:
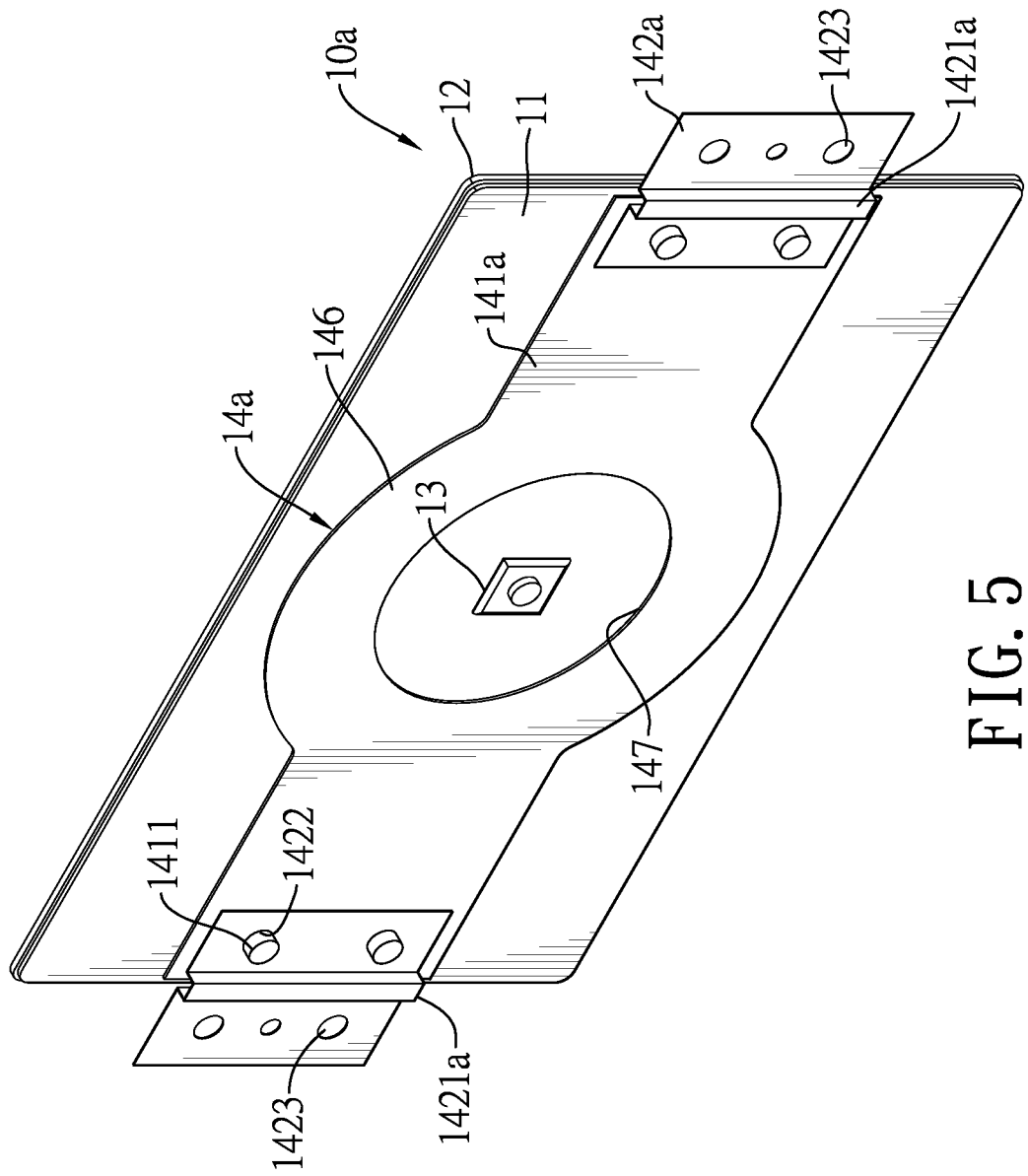
FIG. 5 is a perspective view of a second embodiment of an input module in accordance with the present invention.
Figure 6:
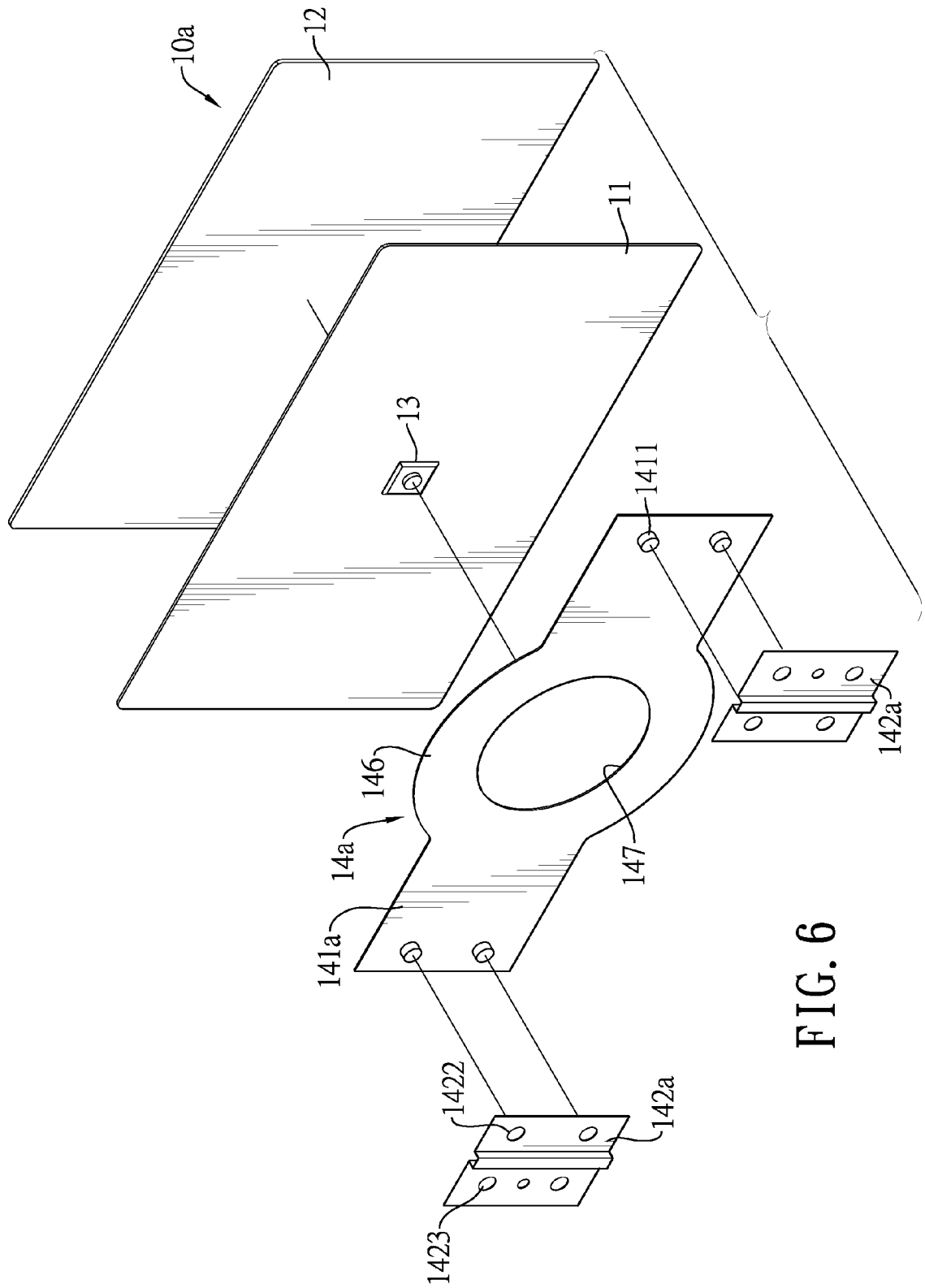
FIG. 6 is an exploded perspective view of the input module in FIG. 5.
Figure 8A:
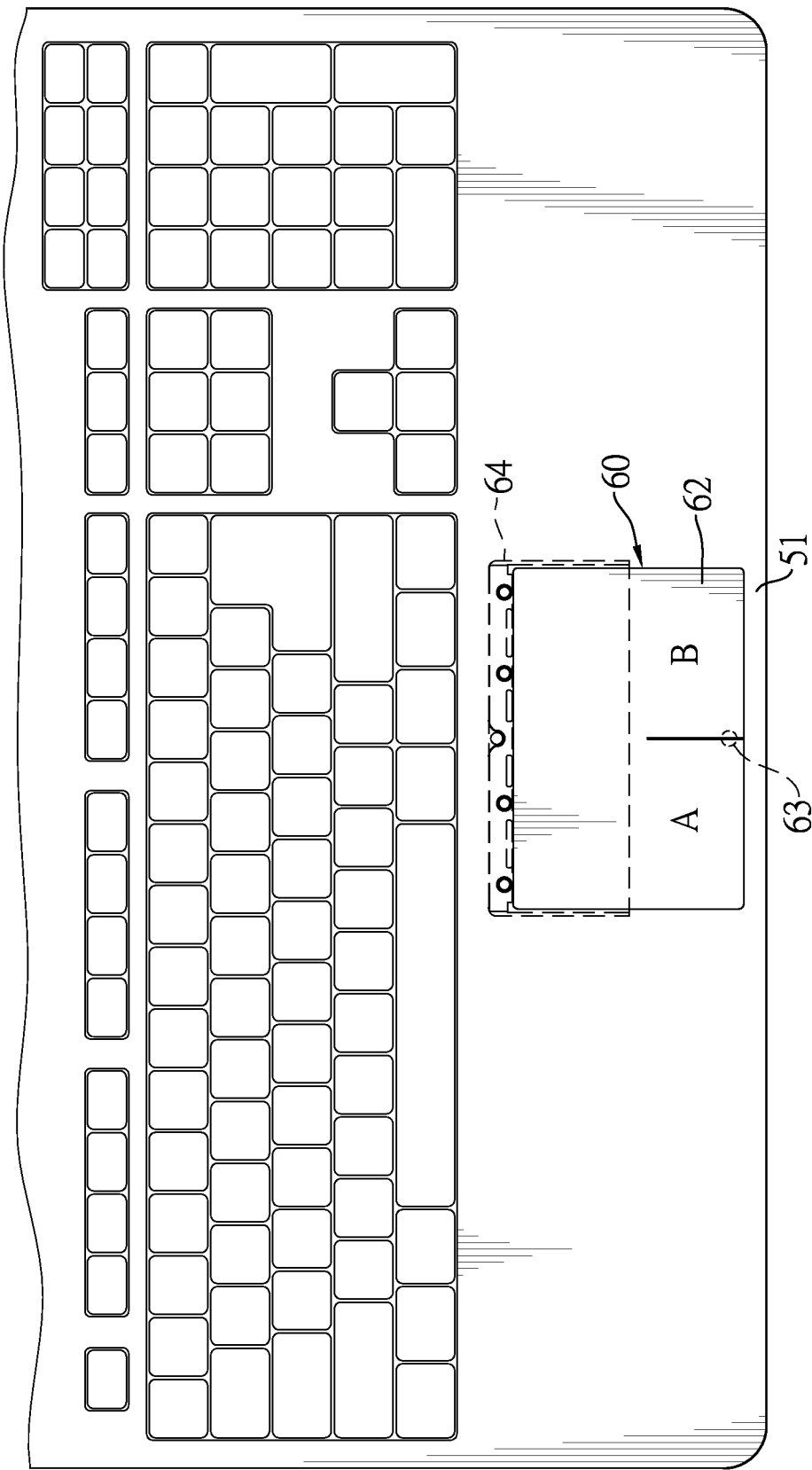
FIG. 8A is a partial top view of a conventional portable electronic device.
Figure 8B:
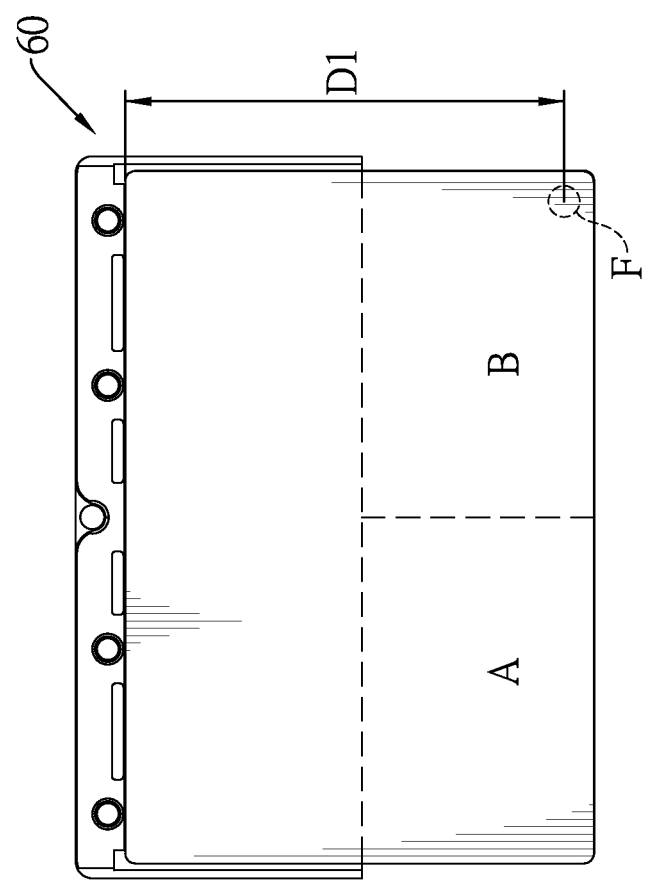
FIG. 8B is a top view of an input module of the conventional portable electronic device.
Figure 9:
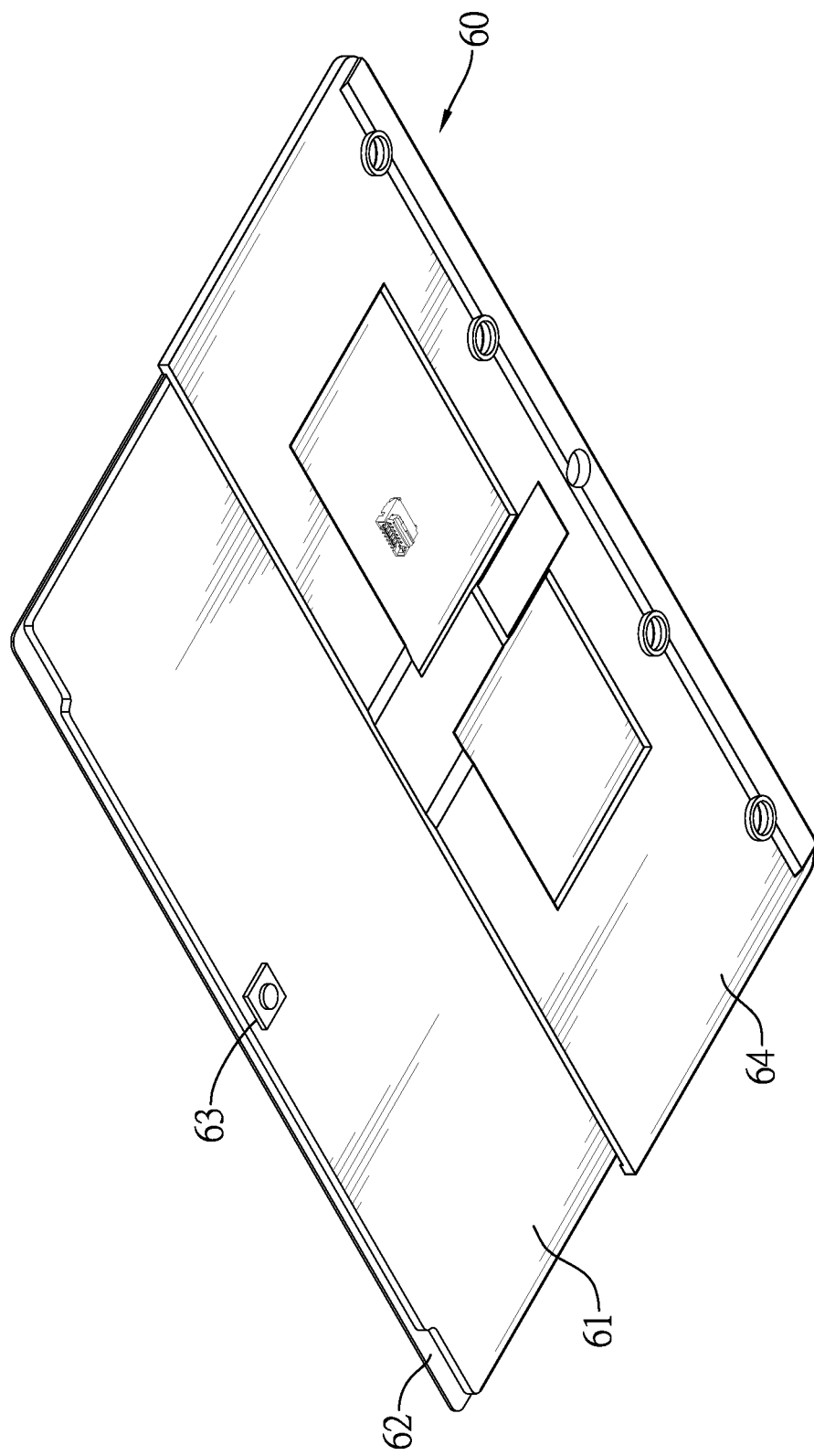
FIG. 9 is a perspective view of the input module in FIG. 8B.
Figure 10:
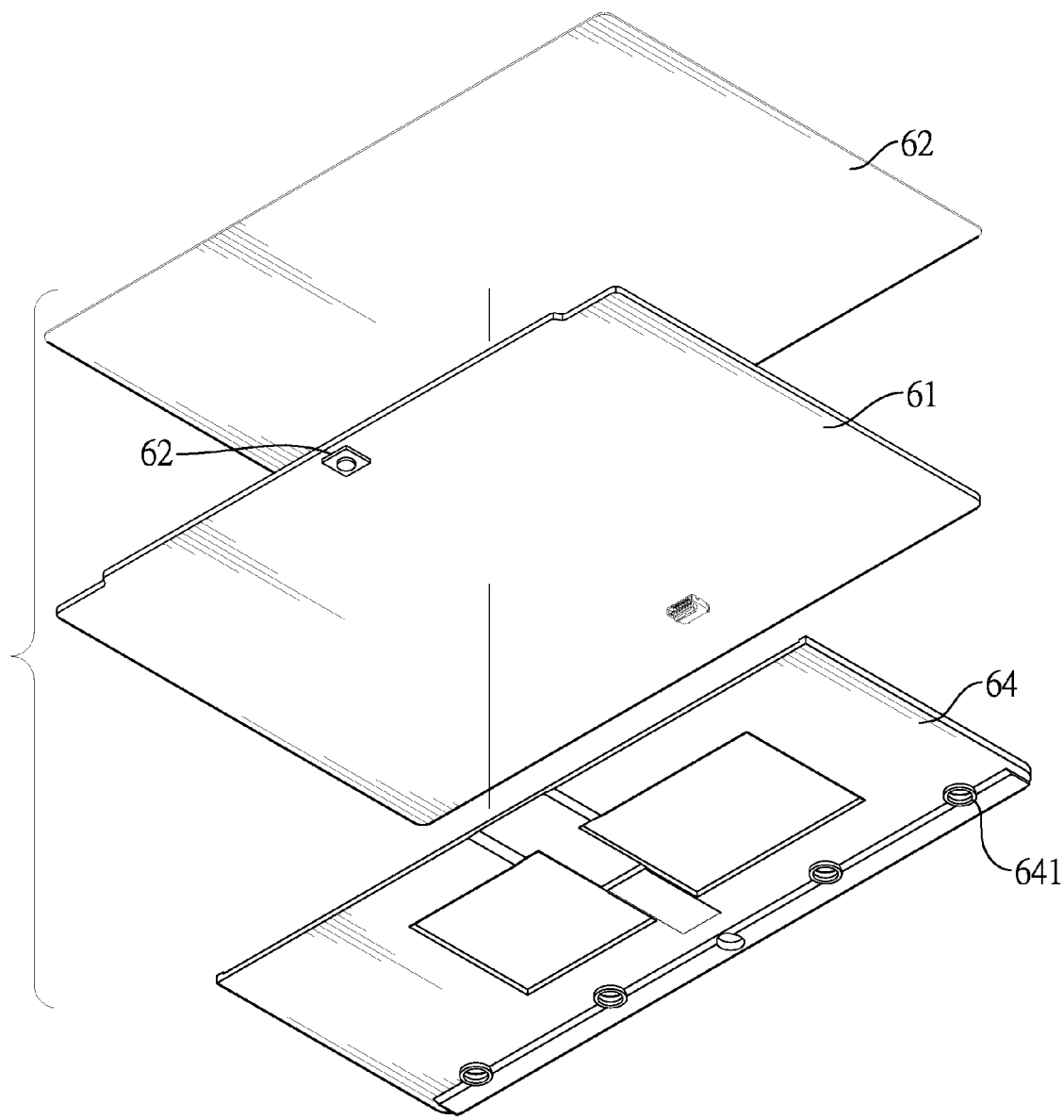
FIG. 10 is an exploded perspective view of the input module in FIG. 8B.
Figure 11:
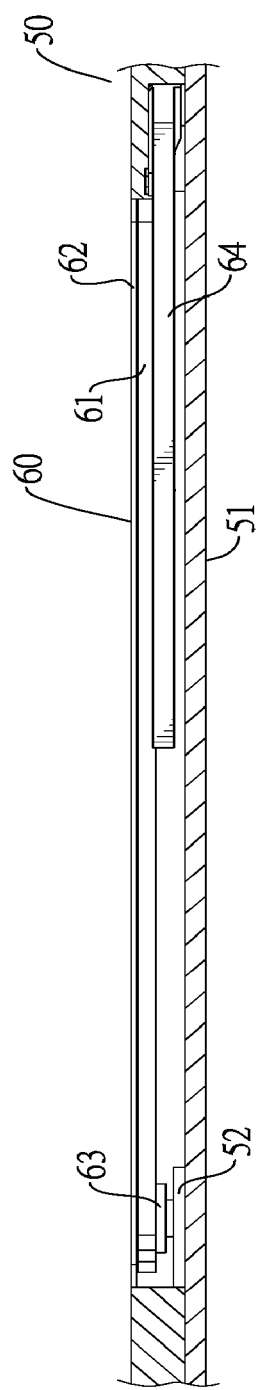
FIG. 11 is a partial cross-sectional side view of the input module in FIG. 8B.

With reference to FIGS. 5 and 6, a second embodiment of an input module 10a in accordance with the present invention similarly has a sensing substrate 11, a cover lens 12, a physical switch 13 and a flexible bridging board 14a. However, the flexible bridging board 14a of the present embodiment differs from the first embodiment, and has a bridging body 141a and two fixing portions 142a.

The bridging body 141a corresponds to and is attached to the bottom surface of the sensing substrate 11, and has a ring portion 146 corresponding to a position of the physical switch 13 for the physical switch 13 to align with a central opening 147 of the ring portion 146 and avoiding to interfere with the operation of the physical switch 13. The bridging body 141a further has at least one fixing protrusion 1411 formed on each of two sides of the bridging body 141a corresponding to the two relatively short sides of the sensing substrate 11. In the present embodiment, the bridging body 141a is made of metal, plastic material or other similar material.

Each fixing portion 142a has at least one inner hole 1422 and at least one outer hole 1423. The at least one inner hole 1422 is formed through one side of each fixing portion 142a, respectively corresponds to the at least one fixing protrusion 1411, and engages the corresponding fixing protrusion 1411 for one side of the fixing portion 142a to be securely mounted on a corresponding side of the bridging body 141a. The at least one outer hole 1423 is formed through the other opposite side of the fixing portion 142a protruding beyond a corresponding relatively short side of the sensing substrate 11 for at least one fastening element, such as bolt, to securely mount the fixing portion on a corresponding position of the assembly portion 22. With reference to FIG. 7A, each fixing portion 142a in the present embodiment is a metal sheet and has a bending portion 1421a formed between the at least one inner hole 1422 and the at least one outer hole 1423. For example, the bending portion 1421a has a U-shaped cross section and serves to resist bending deformation.

With further reference to FIG. 7A, a second embodiment of a portable electronic device 20a is shown. Similarly, the body of the portable electronic device 20a has an opening 21 and an assembly portion 22. The opening 21 is formed through one side of the body. The assembly portion 22 is mounted to correspond to the opening 21. The foregoing second embodiment of the input module 10a is mounted on the assembly portion 22. Specifically, the two relatively short sides of the flexible bridging board 14a of the input module 22 are fastened on the assembly portion 22, and one side of each fixing portion 142a is securely mounted on the assembly portion 22. With reference to FIG. 7B, when users press the input module 20a, the bending portion 1421a is deflected downwards, the central physical switch 13 is moved downwards to abut against the raised block 221 of the assembly portion 22 and is activated, and a corresponding control signal is outputted according to the pressed position on the cover lens 12. After the input module 20a is not pressed, the bending portion 1421a of the fixing portion 142a recovers its original shape.

Besides, the flexible bridging board 14 of the present invention can be adjustably mounted on a position of the sensing substrate 11 in response to an application or a structure of the assembly portion 22. In other words, the two relatively long sides of the flexible bridging board 14 can kept at unequal distances from the corresponding relatively long sides of the sensing substrate 11 and the distances can vary according to different applications.

From the foregoing two embodiments, the input module of the present invention has the following advantages.

1. Less likelihood of permanent deformation after long-time operation. As the input module is mounted on the assembly portion with its two relatively short sides and a physical switch is centrally mounted on the bottom surface of the sensing substrate, a distance D2 from any pressed point 'F' on the cover lens to a nearest fixed point on the input module of the present invention is effectively shortened in comparison with the distance on the conventional input module with a single relatively long side fastened. With further reference to FIG. 3B, as the torque generated by the pressed point 'F' is lowered and the bending stress applied to the input module is reduced, the input module can be protected against excessive deformation and the life duration of the input module is prolonged.

2. Stable support ability: Because the input module is mounted on the assembly portion with its two relatively short sides and the flexible bridging board can be centrally attached on the bottom surface of the sensing substrate, the fixing means of the present invention provides more stable support strength than the conventional input device fastened with one side thereof.

3. Fully configurable multi-functional buttons: As the physical switch of the input module is mounted on a central position of the input module and two relatively long sides of the input module are fixed, users can active the physical switch by touching any area on the cover lens. Besides the two corner areas adjacent to one of the relatively long sides capable of implementing the function of the left button and the right button, the two corner areas adjacent to the other relatively long side and an area corresponding to the physical switch are configurable for other functions, rendering the entire area of the cover lens configurable for various function buttons.

4. less likelihood of storage of dirt and filth: Since the input module is not easily deformed, no gap is generated as a result of long-time operation after the input module is mounted, thereby eliminating the issue for cleaning the stored dirt and filth.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An input module of a portable electronic device comprising:
　a sensing substrate having:
　　a top surface;
　　a bottom surface opposite to the top surface;
　　two relatively long sides; and
　　two relatively short sides;
　a cover lens mounted on the top surface of the sensing substrate;
　a physical switch mounted on and electrically connected to the bottom surface of the sensing substrate; and
　a flexible bridging board mounted on the bottom surface of the sensing substrate and having:
　　two relatively short sides respectively protruding from the two relatively short sides of the sensing substrate, and
　　two relatively long sides, each relatively long side kept at a distance from one of the relatively long sides of the sensing substrate;
　wherein each of the two relatively short sides of the flexible bridging board comprises a fixing portion and the fixing portion is connected to a bridging body of the flexible bridging hoard through a bending portion;
　wherein each fixing portion is arranged below au bridging body and the two bending portions respectively extend toward the exterior of the two relatively short sides of the flexible bridging board;
　wherein the bridging body comprises an opening corresponding to the physical switch; and
　wherein the two bending portions are arranged below the bottom surface of the bridging body.

2. The input module as claimed in claim 1, wherein the flexible bridging board is narrower than the sensing substrate in width, and the two relatively long side are kept at an equal distance from the corresponding relatively long sides of the sensing substrate.

3. The input module as claimed in claim 2, wherein the flexible bridging board has:
　the bridging body flatly mounted on the bottom surface of the sensing substrate and having:
　　the opening formed through the bridging body to correspond to the physical switch; and
　　two relatively short sides; and
　the two fixing portions respectively connected with the two relatively short sides of the bridging body.

4. The input module as claimed in claim 3, wherein the flexible bridging board further has the bending portion integrally formed between the bridging body and each fixing portion of the flexible bridging board.

5. The input module as claimed in claim 3, wherein the bridging body of the flexible bridging board further has two support wings, each support wing formed on and protruding from one of the relatively long sides toward a corresponding relatively long side of the sensing substrate.

6. The input module as claimed in claim 3, wherein each fixing portion of the flexible bridging board has at least one fixing hole formed through the fixing portion.

7. The input module as claimed in claim 2, wherein the flexible bridging board has:
　the bridging body flatly mounted on the bottom surface of the sensing substrate and having:
　　a ring portion corresponding to a position of the physical switch for the physical switch to align with the opening; and
　　two relatively short sides; and
　the two fixing portions, wherein one side of each fixing portion is connected with one of the two relatively short sides of the bridging body.

8. The input module as claimed in claim 1, wherein the physical switch is centrally mounted on the bottom surface of the sensing substrate.

9. The input module as claimed in claim 8, wherein the flexible bridging board has:
　the bridging body flatly mounted on the bottom surface of the sensing substrate and having:
　　a ring portion corresponding to a position of the physical switch for the physical switch to align with the opening; and
　　two relatively short sides; and
　the two fixing portions, wherein one side of each fixing portion is connected with one of the two relatively short sides of the bridging body.

10. The input module as claimed in claim 1, wherein the flexible bridging board has:
  the bridging body flatly mounted on the bottom surface of the sensing substrate and having:
    the opening formed through the bridging body to correspond to the physical switch; and
    two relatively short sides; and
  the two fixing portions respectively connected with the two relatively short sides of the bridging body.

11. The input module as claimed in claim 10, wherein the flexible bridging board further has the bending portion integrally formed between the bridging body and each fixing portion of the flexible bridging board.

12. The input module as claimed in claim 11, wherein the bridging body of the flexible bridging board further has two support wings, each support wing formed on and protruding from one of the relatively long sides toward a corresponding relatively long side of the sensing substrate.

13. The input module as claimed in claim 10, wherein the bridging body of the flexible bridging board further has two support wings, each support wing formed on and protruding from one of the relatively long sides toward a corresponding relatively long side of the sensing substrate.

14. The input module as claimed in claim 13, wherein the support wings of the flexible bridging board are arced.

15. The input module as claimed in claim 10, wherein each fixing portion of the flexible bridging board has at least one fixing hole formed through the fixing portion.

16. The input module as claimed in claim 10, wherein the opening of the bridging body of the flexible bridging board is rectangular.

17. The input module as claimed in claim 1, wherein the flexible bridging board has:
  the bridging body flatly mounted on the bottom surface of the sensing substrate and having:
    a ring portion corresponding to a position of the physical switch for the physical switch to align with the opening; and
    two relatively short sides; and
  the two fixing portions, wherein one side of each fixing portion is connected with one of the two relatively short sides of the bridging body.

18. The input module as claimed in claim 17, wherein
  the bridging body further has at least one fixing protrusion formed on each of two sides of the bridging body corresponding to the two relatively short sides of the sensing substrate; and
  each fixing portion has at least one inner hole formed through one side of the fixing portion, respectively corresponding to the at least one fixing protrusion, and engaging the corresponding fixing protrusion for one side of the fixing portion to be securely mounted on a corresponding side of the bridging body.

19. The input module as claimed in claim 18, wherein each fixing portion has at least one outer hole formed through the other opposite side of the fixing portion protruding beyond a corresponding relatively short side of the sensing substrate.

20. The input module as claimed in claim 19, wherein each fixing portion is a metal sheet and has a bending portion centrally formed on the fixing portion.

21. The input module as claimed in claim 20, wherein each bending portion has a U-shaped cross section.

22. The input module as claimed in claim 17, wherein each fixing portion has at least one outer hole formed through the other opposite side of the fixing portion protruding beyond a corresponding relatively short side of the sensing substrate.

23. The input module as claimed in claim 17, wherein each fixing portion is a metal sheet and has a bending portion centrally formed on the fixing portion.

24. The input module as claimed in claim 23, wherein each bending portion has a U-shaped cross section.

25. A portable electronic device comprising:
  a body having:
    a first opening formed through one side of the body; and
    an assembly portion correspondingly mounted to the first opening; and
  an input module mounted on the assembly portion through the first opening of the body, and having:
    a sensing substrate having:
      a top surface;
      a bottom surface opposite to the top surface;
      two relatively long sides; and
      two relatively short sides;
    a cover lens mounted on the top surface of the sensing substrate and exposed from the first opening of the body;
    a physical switch mounted on and electrically connected to the bottom surface of the sensing substrate; and
    a flexible bridging board mounted on the bottom surface of the sensing substrate and having:
      two relatively short sides respectively protruding from the two relatively short sides of the sensing substrate and mounted on the assembly portion of the body, and
      two relatively long sides, each relatively long side kept at a distance from one of the relatively long sides of the sensing substrate;
    wherein each of the two relatively short sides of the flexible bridging board comprises a fixing portion and the fixing portion is connected to a bridging body of the flexible bridging board through a bending portion;
    wherein each fixing portion is arranged below the bridging body and the two bending portions respectively extend toward the exterior of the two relatively short sides of the flexible bridging board;
  wherein the bridging body comprises a second opening corresponding to the physical switch; and
  wherein the two bending portions are arranged below the bottom surface of the bridging body.

26. The portable electronic device as claimed in claim 25, wherein the flexible bridging board is narrower than the sensing substrate in width, and the relatively long sides of the flexible bridging board are kept at an equal distance from the corresponding relatively long sides of the sensing substrate.

27. The portable electronic device as claimed in claim 26, wherein the flexible bridging board has:
  the bridging body flatly mounted on the bottom surface of the sensing substrate and having:
    the second opening formed through the bridging body to correspond to the physical switch; and
    two relatively short sides; and
  the two fixing portions respectively connected with the two relatively short sides of the bridging body.

28. The portable electronic device as claimed in claim 27, wherein the flexible bridging board further has a bending portion integrally formed between the bridging body and each fixing portion of the flexible bridging board.

29. The portable electronic device as claimed in claim 27, wherein the bridging body of the flexible bridging board further has two support wings, each support wing formed on and protruding from one of the relatively long sides toward a corresponding relatively long side of the sensing substrate.

30. The portable electronic device as claimed in claim 27, wherein each fixing portion of the flexible bridging board has at least one fixing hole formed through the fixing portion and mounted through by a fastening element for the fixing portion to be securely mounted on the assembly portion.

31. The portable electronic device as claimed in claim 26, wherein the flexible bridging board has:
  the bridging body flatly mounted on the bottom surface of the sensing substrate and having:
    a ring portion corresponding to a position of the physical switch for the physical switch to align with the second opening; and
    two relatively short sides; and
  the two fixing portions, wherein one side of each fixing portion is connected with one of the two relatively short sides of the bridging body, and the other side of the fixing portion is mounted on the assembly portion.

32. The portable electronic device as claimed in claim 25, wherein the physical switch is centrally mounted on the bottom surface of the sensing substrate and aligns with a raised block of the assembly portion.

33. The portable electronic device as claimed in claim 32, wherein the flexible bridging board has:
  the bridging body flatly mounted on the bottom surface of the sensing substrate and having:
    a ring portion corresponding to a position of the physical switch for the physical switch to align with the second opening ; and
    two relatively short sides; and
  the two fixing portions, wherein one side of each fixing portion is connected with one of the two relatively short sides of the bridging body, and the other side of the fixing portion is mounted on the assembly portion.

34. The portable electronic device as claimed in claim 25, wherein the flexible bridging board has:
  the bridging body flatly mounted on the bottom surface of the sensing substrate and having:
    the second opening formed through the bridging body to correspond to the physical switch; and
    two relatively short sides; and
  the two fixing portions respectively connected with the two relatively short sides of the bridging body.

35. The portable electronic device as claimed in claim 34, wherein the flexible bridging board further has a bending portion integrally formed between the bridging body and each fixing portion of the flexible bridging board.

36. The portable electronic device as claimed in claim 35, wherein the bridging body of the flexible bridging board further has two support wings, each support wing formed on and protruding from one of the relatively long sides toward a corresponding relatively long side of the sensing substrate.

37. The portable electronic device as claimed in claim 34, wherein the bridging body of the flexible bridging board further has two support wings, each support wing formed on and protruding from one of the relatively long sides toward a corresponding relatively long side of the sensing substrate.

38. The portable electronic device as claimed in claim 37, wherein the support wings of the flexible bridging board are arced.

39. The portable electronic device as claimed in claim 34, wherein each fixing portion of the flexible bridging board has at least one fixing hole formed through the fixing portion and mounted through by a fastening element for the fixing portion to be securely mounted on the assembly portion.

40. The portable electronic device as claimed in claim 34, wherein the second opening of the bridging body of the flexible bridging board is rectangular.

41. The portable electronic device as claimed in claim 25, wherein the flexible bridging board has:
  the bridging body flatly mounted on the bottom surface of the sensing substrate and having:
    a circle portion corresponding to a position of the physical switch for the physical switch to align with the second opening; and
    two relatively short sides; and
  the two fixing portions, wherein one side of each fixing portion is connected with one of the two relatively short sides of the bridging body, and the other side of the fixing portion is mounted on the assembly portion.

42. The portable electronic device as claimed in claim 41, Wherein
  the bridging body further has at least one fixing protrusion formed on each of two sides of the bridging body corresponding to the two relatively short sides of the sensing substrate; and
  each fixing portion has at least one inner hole formed through one side of the fixing portion, respectively corresponding to the at least one fixing protrusion, and engaging the corresponding fixing protrusion for one side of the fixing portion to be securely mounted on a corresponding side of the bridging body.

43. The portable electronic device as claimed in claim 42, wherein each fixing portion has at least one outer hole formed through the other opposite side of the, fixing portion protruding beyond a corresponding relatively short side of the sensing substrate.

44. The portable electronic device as claimed in claim 43, wherein each fixing portion is a metal sheet and has the bending portion centrally formed on the fixing portion.

45. The portable electronic device as claimed in claim 44, wherein each bending portion has a U-shaped cross section.

46. The portable electronic device as claimed in claim 41, wherein each fixing portion has at least one outer hole formed through the other opposite side of the fixing portion protruding beyond a corresponding relatively short side of the sensing substrate and mounted through by a fastening element for the fixing portion to be securely mounted on the assembly portion.

47. The portable electronic device as claimed in claim 41, wherein each fixing portion is a metal sheet and has the bending portion centrally formed on the fixing portion.

48. The portable electronic device as claimed in claim 47, wherein each bending portion has a U-shaped cross section.

49. A flexible bridging board of an input module comprising:
  a bridging body being rectangular and having two relatively short sides; and
  two fixing portions respectively connected with the two relatively short sides of the bridging body;
  wherein the bridging body further comprises at least one fixing protrusion formed on a bottom surface of each of the two relatively short sides of the bridging body;
  wherein each fixing portion has at least one inner hole formed through one side of the fixing portion connected to one of the two relative short sides of the bridging body;
  wherein the at least one fixed protrusion respectively corresponds to the at least one inner hole to allow the at least one fixed protrusion to be respectively inserted in the at least one inner hole and cause the two fixing portions to be respectively mounted on the bottom surface of the two short sides of the bridging body;

wherein each of the two fixing portions is located on the exterior of the bridging body and comprises a bending portion;

wherein each of the two fixing portions is used to fasten the flexible bridging board on a body of an electronic device;

wherein each bending portion extends toward the exterior of a corresponding relatively short side of the bridging body so that the two fixing portions respectively protrude beyond the two relatively short sides of the bridging body;

wherein the bridging body comprises an opening formed through the bridging body and a physical switch mounted on and electrically connected to the bottom surface of the sensing substrate; and wherein a top surface of the bridging body bears the sensing substrate.

50. The flexible bridging board as claimed in claim 49, wherein the bridging body further has a ring portion centrally formed thereon and having the opening centrally formed through the ring portion.

51. The flexible bridging board as claimed in claim 49, wherein each fixing portion further comprises at least one outer hole formed through the other side of the fixing portion.

52. The flexible bridging board as claimed in claim 49, wherein each fixing portion is a metal sheet.

53. The flexible bridging board as claimed in claim 49, wherein each bending portion has a U-shaped cross section.

* * * * *